United States Patent [19]

Tanaka et al.

[11] Patent Number: 5,031,711
[45] Date of Patent: Jul. 16, 1991

[54] CONVEYANCE DEVICE

[75] Inventors: Makoto Tanaka, Tsukuba; Keizo Saito, Tsuchiura, both of Japan

[73] Assignee: Agency of Industrial Science & Technology, Ministry of International Trade & Industry, Tokyo, Japan

[21] Appl. No.: 433,137

[22] Filed: Nov. 8, 1989

[30] Foreign Application Priority Data

Nov. 17, 1988 [JP] Japan ................. 63-290895

[51] Int. Cl.$^5$ ................................. F03G 7/06
[52] U.S. Cl. ..................... 180/7.1; 60/527; 180/219; 180/357
[58] Field of Search ............ 180/2.1, 7.1, 357, 342, 180/219, 9.21, 9.22, 9.3, 10; 474/101, 148; 60/527

[56] References Cited

U.S. PATENT DOCUMENTS

| 3,760,645 | 9/1973 | Soto et al. | 60/527 |
| 4,117,680 | 10/1978 | Smith | 60/527 |
| 4,275,561 | 6/1981 | Wang | 60/527 |
| 4,302,938 | 12/1981 | Li | 60/527 |

OTHER PUBLICATIONS

Designers in Actions, "Machine Design", 5/26/83.

Primary Examiner—David M. Mitchell
Attorney, Agent, or Firm—Oblon, Spivak, McClelland, Maier & Neustadt

[57] ABSTRACT

A conveyance device has a high-temperature pulley and a low-temperature pulley rotatably mounted on a chassis at a prescribed distance from each other and an endless belt constituted of a shape memory alloy is wound around the two pulleys. The high-temperature pulley is maintained at a temperature higher, and the low-temperature pulley at a temperature lower, than the transformation temperature of the shape memory alloy. The pulleys are rotated and the chassis powered to move by the force produced by the shape memory alloy when it restores to its memorized shape.

8 Claims, 1 Drawing Sheet

CONVEYANCE DEVICE

BACKGROUND OF THE INVENTION

1. Field of the Invention

This invention relates to a conveyance device in which the motion of a chassis is powered using a shape memory alloy.

2. Prior Art Statement

Conveyance devices are generally driven either by energy supplied from the exterior or by mechanical driving power generated by an energy source mounted on the device. The energy is ordinarily supplied as electrical or thermal energy which is converted into kinetic energy by a power mechanism such as a motor or an engine and the kinetic energy is used to drive the chassis of the device.

The power conversion mechanism for converting the electric or thermal energy into mechanical energy is, however, generally relatively large in size and weight and, moreover, is complex in structure. Thus when it is mounted on the conveyance device it disadvantageously makes the device considerably larger.

It is, therefore, difficult to apply the conventional power mechanism to a small conveyance device, a small scale transport operation or the like.

One object of the invention is to provide a conveyance device having a power mechanism enabling thermal energy to be converted directly into mechanical driving power by a simple mechanism, obviating the need for a power mechanism of large size or weight.

This invention realizes this object by providing a conveyance device comprising a chassis, a pair of pulleys consisting of a high-temperature pulley constituted as a heat storage body and a low-temperature pulley rotatably supported on the chassis, a belt made of a shape memory alloy wound around the pulleys and memorizing a shape arcing in the direction opposite to the direction the belt arcs by being wound around the pulleys, and a drive wheel for moving the chassis by rotating power from the pulleys.

The high-temperature pulley constituted as a heat storage body is maintained at a temperature slightly higher than the transformation temperature of the shape memory alloy constituting the belt. When the temperature of the portion of the belt in contact with the high-temperature pulley rises above the transformation temperature, a force arises in this portion of the belt for restoring it to the memorized shape. This force operates to move this portion of the belt in the direction of separating it from the high-temperature pulley. This movement of the belt rotates the pulley and the rotation of the pulley is used to power the motion of the chassis.

The present invention thus enables the conveyance device to be powered very economically by a simple mechanism of a belt wound about a pair of pulleys.

The above and other objects and features of the invention will become more apparent from the following detailed description with reference to the accompanying drawings.

DETAILED DESCRIPTION OF THE PREFERRED EMBODIMENT

Figure 1:
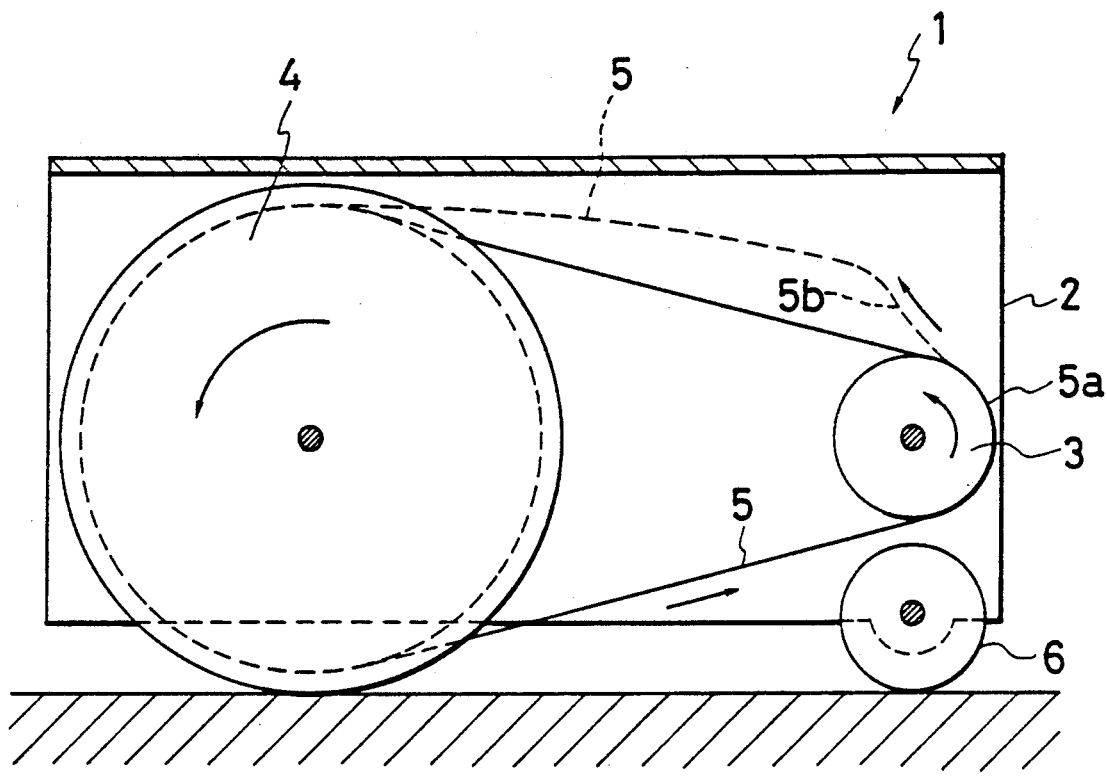
FIG. 1 is a schematic side sectional view of an embodiment of the conveyance device according to the present invention.
Figure 2:
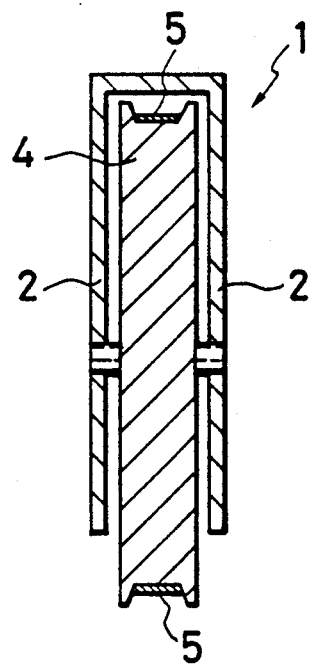
FIG. 2 is a partial sectional view of the portion in the vicinity of the low-temperature pulley of the conveyance device of FIG. 1.

FIGS. 1 and 2 show an embodiment of the conveyance device according to the present invention. The conveyance device has a chassis 1 comprising a pair of support plates 2 between which there are rotatably supported a small diameter high-temperature pulley 3 constituted as a heat storage body of metal or other such material having a large thermal capacity and a low-temperature pulley 4. A flat belt 5 constituted of a shape memory alloy is wound around the pulleys 3, 4. The shape memorized by the belt 5 arcs in the direction opposite to the direction the belt arcs by being wound around the pulleys 3, 4. Namely, if the belt should be cut off and have its transformation temperature, it would arc into a circular or spiral shape curved in the opposite direction from that in which it is curved by being wound about the pulleys 3, 4.

As the shape memory alloy of the belt there can preferably be used a Ni-Ti alloy whose transformation temperature is adjusted to be somewhat higher than room temperature.

Giving the memory alloy of the belt 5 a flat shape ensures face-to-face contact with the pulleys 3, 4 and promotes the absorption and release of heat, thus making it possible to obtain a large driving power.

It suffices for the temperature of the high-temperature pulley 3 to be only slightly higher than the transformation temperature. For instance, if the transformation temperature is 30° C., it is sufficient for the temperature of the high-temperature pulley 3 to be 35–40° C. and the low-temperature pulley 4 to be maintained at not higher than 25° C. Therefore, if the high-temperature pulley 3 is formed of copper, brass, stainless steel or other metal exhibiting good heat storage property and is heated to a temperature higher than the transformation temperature of the alloy, the conveyance device will continue to run until the temperature of the high-temperature pulley 3 falls below the transformation temperature.

Figure 3:
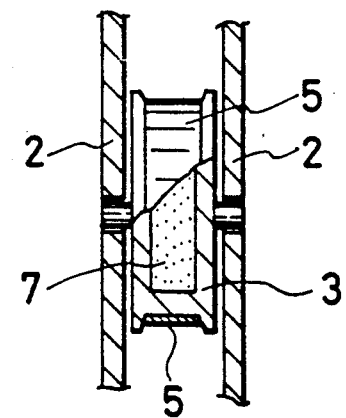
FIG. 3 is a partial sectional view of the portion in the vicinity of the high-temperature pulley of the conveyance device of FIG. 1.

In this embodiment, the high-temperature pulley 3 is itself constituted as a heat storage body and is of a simple structure not including a heating means. Alternatively, however, it is possible as shown in FIG. 3 to constitute the high-temperature pulley 3 with an interior space containing a heat storage body or containing a heat generating body which generates heat by bringing a mixture of metal powder and oxidizing agent into contact with air. In this way, the high-temperature pulley 3 can maintain a temperature higher than the transformation temperature for a longer time, whereby driving of the conveyance device can be continued for a longer time.

In the case where a shape memory alloy belt having a transformation temperature of 30–40° C. is used, it is possible for the low-temperature pulley 4 to cool the belt to below its transformation temperature without using a low-temperature pulley 4 of a specific limited material or properties or cooling the pulley forcibly.

By making the diameter of the high-temperature pulley 3 smaller than that of the low-temperature pulley 4, the strain arising in the belt 5 becomes proportionally larger so that a proportionally larger force is generated when the belt restores to its memorized shape.

In the illustrated embodiment, as the low-temperature pulley 4 doubles as a wheel, part of it projects below the bottom of the chassis 1 and the chassis 1 is provided with a separate wheel 6 for enabling rotating force of the low-temperature pulley 4 to power the motion of the chassis 1. Alternatively, however, it is possible to provide a separate wheel and an appropriate transmission means for transmitting the rotation of the low-temperature pulley 4 to this wheel.

In the conveyance device of the aforesaid arrangement, the high-temperature pulley 3 is heated by an appropriate method to a temperature slightly higher than the transformation temperature of the shape memory alloy constituting the belt 5. As a result, the portion 5a of the belt in contact with the high-temperature pulley 3 is heated, and when its temperature rises above the transformation temperature of the shape memory alloy, the heated portion 5a of the belt 5 generates a force for restoration to the memorized shape. The shape memorized by the belt is one which arcs in the direction opposite to the direction the belt arcs by being wound around the pulleys 3, 4. Therefore, the force for restoring the belt 5 to the memorized shape acts to move the portion 5a of the belt away from the high-temperature pulley 3. As a result, the belt 5 moves in the direction indicated by the arrow in FIG. 1. Without any specific structural device or particular heating methodology, tests have shown that the movement is not predisposed in a particular direction. Motion in either direction is accompanied by rotation of the pulleys 3, 4 so that the chassis 1 moves.

The belt portion 5b restored to the memorized shape upon being heated by the high-temperature pulley 3 cools immediately upon separating from the high-temperature pulley 3. Shortly after separating from the high-temperature pulley 3, the belt portion 5b that has restored to its memorized shape develops strain because of the displacement from the shape in which it was wound around the pulleys 3, 4. As a result, the pulleys 3, 4 and the belt 5 rotate constantly.

By way of a specific example, a conveyance device according to the invention was fabricated using an acrylic resin pulley measuring 110 mm in diameter and 12 mm in thickness as the low-temperature pulley and a brass pulley measuring 30 mm in diameter and 12 mm in thickness as the high-temperature pulley. The two pulleys were rotatably attached at an axis-to-axis separation of 130 mm to a chassis made from two synthetic resin plates, with a portion of the low-temperature wheel projecting beyond the chassis. An endless belt formed of Ni-Ti shape memory alloy having a transformation temperature of 30° C. and measuring 8 mm in width and 0.2 mm in thickness was wound around the two pulleys. A synthetic resin wheel was provided beneath the low-temperature pulley so as to project beyond the chassis.

Before being attached to the chassis and having the belt wound thereabout, the high-temperature pulley was heated to about 60° C. When the completed conveyance device was placed with both its wheels on a flat surface the chassis began running at a speed of about 1 m/sec and traversed a distance of more than 10 m.

Thus according to this invention, there can be realized a conveyance device which does not require a power mechanism of large size and weight but is able to travel by using a simple mechanism to convert thermal energy directly into mechanical driving power. Moreover, the conveyance device according to this invention is very safe and is thus appropriate for use as, for example, a simple transport device or a device to be ridden for amusement.

What is claimed is:

1. A conveyance device comprising:
   a chassis;
   a low-temperature pulley rotatably supported on the chassis at one end thereof, said low-temperature pulley extending below a bottom surface of the chassis;
   a high-temperature pulley comprising a heat storage body, rotatably mounted on the chassis, spaced by a prescribed distance from and in a direction lateral to the low-temperature pulley, and maintained at a prescribed temperature;
   a wheel, rotatably mounted on the chassis in tandem with the low-temperature pulley and extending below the bottom surface of the chassis;
   an endless belt comprising a shape memory alloy band wound about the two pulleys, the endless belt having a memorized shape which arcs in a direction opposite from a direction in which it arcs owing to being wound about the two pulleys, said endless belt having a transformation temperature lower than the prescribed temperature of the high temperature pulley, the two pulleys being rotated by a restoring force of the endless belt which tends to return the belt to its memorized shape, and wherein the low-temperature pulley and the wheel are adapted to be in contact with the ground so as to drive the conveyance device when the conveyance device rests on the ground.

2. A conveyance device according to claim 1 wherein the shape memory alloy is a Ni-Ti alloy having a transformation temperature of about 30° C.

3. A conveyance device according to claim 1 wherein the belt is flat.

4. A conveyance device according to claim 1 wherein the high-temperature pulley is constituted of copper, brass, or stainless steel.

5. A conveyance device according to claim 1 wherein the high-temperature pulley has a heat storage body contained therein.

6. A conveyance device according to claim 1 wherein the high-temperature pulley has a heat generating body contained therein.

7. A conveyance device according to claim 6 wherein the heat generating body is constituted of metal powder and oxidizing agent.

8. A conveyance device according to claim 1 wherein the high-temperature pulley has a smaller diameter than the low-temperature pulley.

* * * * *